(12) United States Patent
Chang et al.

(10) Patent No.: US 11,111,108 B2
(45) Date of Patent: Sep. 7, 2021

(54) COATED SHEAVE

(71) Applicant: OTIS ELEVATOR COMPANY, Farmington, CT (US)

(72) Inventors: Xiaoyuan Chang, Ellington, CT (US); David R. Torlai, Torrington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 487 days.

(21) Appl. No.: 15/971,211

(22) Filed: May 4, 2018

(65) Prior Publication Data

US 2019/0337770 A1  Nov. 7, 2019

(51) Int. Cl.
  *B66B 15/04*  (2006.01)
  *C09D 191/06*  (2006.01)
  *C25D 3/04*  (2006.01)

(52) U.S. Cl.
  CPC ............ *B66B 15/04* (2013.01); *C09D 191/06* (2013.01); *C25D 3/04* (2013.01)

(58) Field of Classification Search
  CPC .......... B66B 15/04; C09D 191/06; C25D 3/04
  See application file for complete search history.

(56) References Cited

U.S. PATENT DOCUMENTS

| | | | | |
|---|---|---|---|---|
| 6,364,061 B2* | 4/2002 | Baranda | ................... | B66B 15/04 |
| | | | | 187/254 |
| 7,318,963 B2* | 1/2008 | Oshimi | .................... | C25D 3/04 |
| | | | | 205/109 |
| 7,905,964 B2* | 3/2011 | Witteler | .................... | C23C 22/22 |
| | | | | 148/274 |
| 9,441,305 B2 | 9/2016 | Lawless et al. | | |
| 2004/0016603 A1* | 1/2004 | Aulanko | .................... | B66B 11/08 |
| | | | | 187/254 |
| 2007/0062762 A1* | 3/2007 | Ach | ........................ | B66B 7/062 |
| | | | | 187/266 |
| 2011/0259676 A1* | 10/2011 | Nardi | ...................... | B66B 15/04 |
| | | | | 187/250 |
| 2011/0318497 A1* | 12/2011 | Beals | ...................... | B66B 15/04 |
| | | | | 427/446 |
| 2015/0191831 A1* | 7/2015 | Lawless | ................... | C23C 26/00 |
| | | | | 427/122 |
| 2015/0210510 A1* | 7/2015 | Chang | ..................... | B66B 15/02 |
| | | | | 156/185 |
| 2016/0039640 A1* | 2/2016 | Martin | .................... | B66B 11/08 |
| | | | | 187/254 |
| 2016/0304321 A1* | 10/2016 | Guilani | ................... | B66B 15/04 |
| 2016/0311070 A1* | 10/2016 | El-Wardany | ............. | B23P 6/00 |
| 2017/0283220 A1* | 10/2017 | Ding | ........................ | D07B 1/22 |
| 2018/0056368 A1* | 3/2018 | Martin | ..................... | B21H 7/14 |
| 2018/0057314 A1* | 3/2018 | Martin | ..................... | F16H 55/38 |

(Continued)

FOREIGN PATENT DOCUMENTS

| | | |
|---|---|---|
| CN | 101851760 A | 10/2010 |
| CN | 102031543 B | 12/2011 |
| CN | 102553808 | 7/2012 |

(Continued)

*Primary Examiner* — Michael A Riegelman
(74) *Attorney, Agent, or Firm* — Carlson, Gaskey & Olds, P.C.

(57) ABSTRACT

An elevator sheave includes a sheave body and a coating on a surface of the sheave body. The coating includes microcracks and a filler in the microcracks. A method of making a sheave for an elevator system is also disclosed.

7 Claims, 2 Drawing Sheets

(56) References Cited

U.S. PATENT DOCUMENTS

2019/0337770 A1\* 11/2019 Chang .................... B66B 15/04
2020/0055706 A1\* 2/2020 Chang .................... C09D 1/00

FOREIGN PATENT DOCUMENTS

| CN | 102688846 | | 9/2012 |
|----|-----------|----|--------|
| EP | 0448016 | | 9/1999 |
| EP | 2006236 | | 12/2008 |
| EP | 1236813 | B1 | 5/2011 |
| EP | 2480612 | B1 | 3/2013 |

\* cited by examiner

COATED SHEAVE

BACKGROUND

Traction-based elevators generally include a load bearing assembly which is wrapped around sheaves and connected to a car for suspending and moving the elevator. The load bearing assembly may comprise one or more flat belts or round ropes. The flat belts are received on the sheave in a friction relationship, such that rotation of the sheave causes movement of the load bearing assembly and the car.

It is important to maintain traction between the sheave and the load bearing assembly to maintain desired operation of the elevator. The friction relationship can be reduced by damage (such as wear) to the sheave. To this end, sheaves are coated with various protective coating materials to improve their lifetimes. Known coatings, however, are still subject to corrosion.

SUMMARY

An elevator sheave according to an example of the present disclosure includes a sheave body and a coating on a surface of the sheave body. The coating includes microcracks and a filler in the microcracks.

In a further embodiment according to any of the foregoing embodiments, the filler comprises a wax.

In a further embodiment according to any of the foregoing embodiments, the coating is a hard chrome coating.

In a further embodiment according to any of the foregoing embodiments, the hard chrome coating is plated onto the sheave.

In a further embodiment according to any of the foregoing embodiments, the elevator system includes the elevator sheave.

In a further embodiment according to any of the foregoing embodiments, the elevator system includes a load bearing assembly. The load bearing assembly is partially wrapped around the sheave. The load bearing assembly is in a friction relationship with the coating on the sheave.

In a further embodiment according to any of the foregoing embodiments, the filler is inert with respect to an external material of the load bearing assembly.

In a further embodiment according to any of the foregoing embodiments, the load bearing assembly includes a jacket. The jacket includes a polymer. The filler is inert to the polymer.

In a further embodiment according to any of the foregoing embodiments, the jacket includes at least one of a thermoplastic elastomer polymers, a thermosetting elastomer polymer, and a rubber polymer.

In a further embodiment according to any of the foregoing embodiments, the filler includes a material and the jacket comprises the material.

In a further embodiment according to any of the foregoing embodiments, the filler comprises a wax and the jacket includes the wax.

In a further embodiment according to any of the foregoing embodiments, the jacket includes polyurethane. The polyurethane includes wax additives. The filler includes at least one of the wax additives.

A method of making a sheave for an elevator system according to an example of the present disclosure includes applying a filler to a traction sheave. The filler infiltrates microcracks in the coating to at least partially fill the microcracks.

In a further embodiment according to any of the foregoing embodiments, the filler includes a wax.

In a further embodiment according to any of the foregoing embodiments, the applying is done in a vacuum environment.

In a further embodiment according to any of the foregoing embodiments, the filler is mixed with a solvent prior to applying the filler to the microcracks.

In a further embodiment according to any of the foregoing embodiments, the solvent is a surfactant.

In a further embodiment according to any of the foregoing embodiments, the coating is a hard chrome coating.

In a further embodiment according to any of the foregoing embodiments, the traction sheave is configured to receive a load bearing assembly. The filler is inert with respect to a jacket of the load bearing assembly.

In a further embodiment according to any of the foregoing embodiments, the jacket includes a polymer material including at least one wax component. The filler comprises the at least one component.

DETAILED DESCRIPTION

Figure 1:
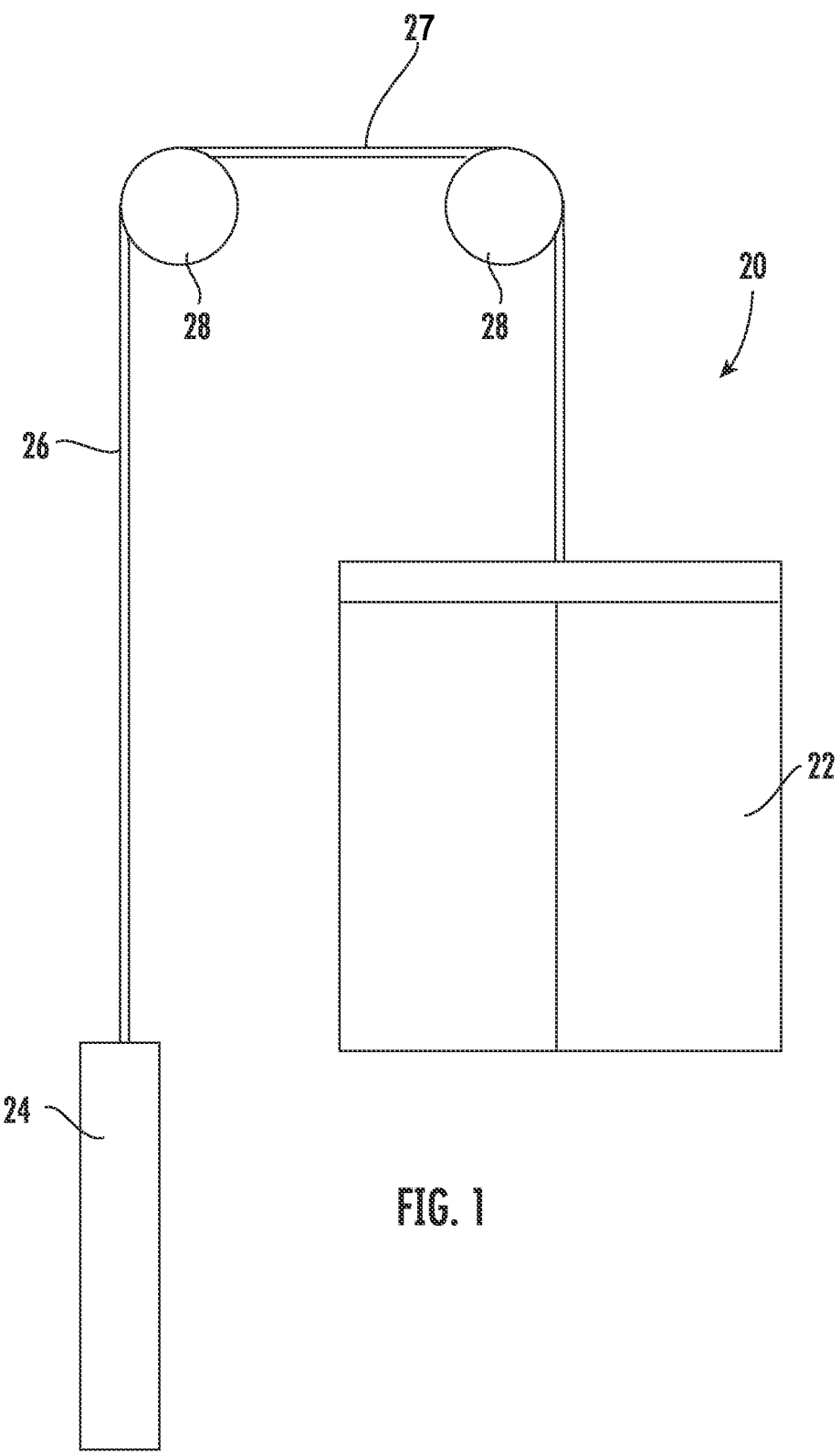
FIG. 1 schematically illustrates selected portions of an elevator system including a load bearing assembly and sheave designed according to an embodiment of this invention.

FIG. 1 schematically shows selected portions of an example elevator system 20. An elevator car 22 and counterweight 24 are suspended by a load bearing assembly 26. In one example, the load bearing assembly 26 comprises a plurality of flat belts. In another example, the load bearing assembly 26 comprises a plurality of round ropes.

The load bearing assembly 26 supports the weight of the elevator car 22 and the counterweight 24 and facilitates movement of the elevator car 22 into desired positions by moving along sheaves 28. In this example, one of the sheaves 28 is a traction sheave that is moved by an elevator machine in a known manner to cause the desired movement and placement of the elevator car 22. The other sheave 28 is an idler sheave.

Figure 2:
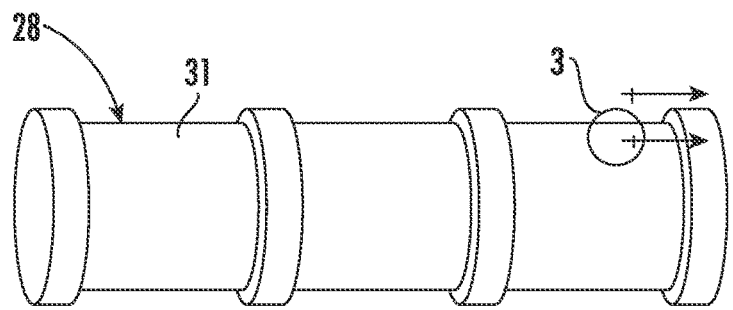
FIG. 2 schematically shows a load bearing assembly looped around a sheave of the elevator system of FIG. 1.

FIG. 2 schematically shows an example sheave 28. Traction between the load bearing assembly 26 and the sheave 28 allows for achieving the desired movement or placement of the elevator car 22. That is, friction between the sheave 28 and the load bearing assembly 26 at the interface between them causes the load bearing assembly 26 to move with the sheave 28 when the sheave 28 is rotated. Damage to the sheave 28 surface, such as wear or corrosion, interferes with the friction relationship. Therefore, sheave 28 is coated with a wear-resistant coating 31, as shown schematically in FIG. 3.

One example wear-resistant coating comprises a hard chrome. Hard chrome coatings are susceptible to corrosion.

Figure 3:
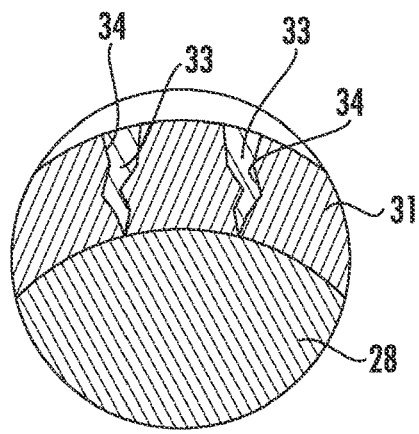
FIG. 3 schematically shows a cross-sectional detailed view of a portion of the sheave encircled at 3 in FIG. 2.

With continued reference to FIG. 3, one cause of corrosion is microcracks 34 that form in the hard chrome coating 31 during the application of the coating 31 to the sheave 28, such as by a plating process. Microcracks 34 act as initiation sites for corrosive reactions because they allow corrosive materials to enter the coating 32 and to eventually enter the base material of sheave 28. Corrosion of the coating 32 interferes with the friction relationship between the sheave 28 and the load bearing assembly 26, which interferes with the ability of the load bearing assembly 26 and the sheave 28, and necessitates replacement of the sheave 28.

In the illustrated example, microcracks 34 are filled in with a noble, passive filler 33, such as wax. The filler 33 prevents corrosive substances from entering the microcracks 34 and thus prevents or reduces corrosion of the sheave 28.

The filler 33 is inert with respect to the material of the load bearing assembly 26. In one example, the load bearing assembly 26 has a thermoplastic jacket 27 on its exterior, and the thermoplastic jacket 27 contacts the sheave 28. In a particular example, the jacket 27 comprises a thermoplastic or thermosetting elastomer polymer (such as polyurethane) or rubber polymer or mixtures and blends thereof. Because the filler 33 is inert with respect to the load bearing assembly 26, it does not cause wear or breakdown of the load bearing assembly 26 and does not interfere with the friction relationship between the load bearing assembly 26 and the sheave 28.

In a particular example, the filler 33 is inert with respect to the load bearing assembly 26 because it comprises a material that the jacket 27 of the load bearing assembly 26 also includes.

In one example, the filler 33 is a wax that infiltrates into the microcracks 32. Example wax fillers 33 are paraffin wax, polyethylene wax, and mixtures thereof. In a particular example, the filler 33 is a wax which is the same type of wax that is a component of the jacket 27 of the load bearing assembly. For example, polyurethanes contain wax additives and the wax filler 33 comprises at least one of the wax additives of the polyurethane used for the jacket 27 of the load bearing assembly 26.

Figure 4:
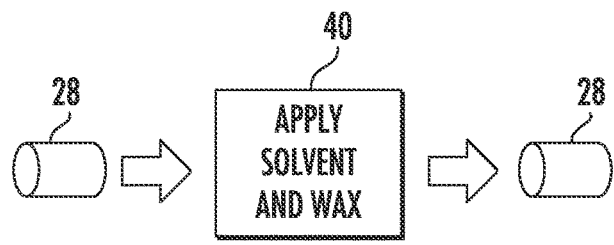
FIG. 4 schematically illustrates an example method of treating a sheave surface according to an embodiment of this invention.

One example method of applying the wax filler 33 to the microcracks 32 is schematically shown in FIG. 4. In this example, the wax is mixed with a surfactant-type solvent at 40 to reduce the surface energy and tension of liquid wax. The wax/solvent mixture is applied to the sheave 28 by any known method, such as spraying, dipping and brushing, etc. The solvent reduces the in surface energy and tension to ensure that the wax 33 penetrates into the microcracks 31.

Figure 5:
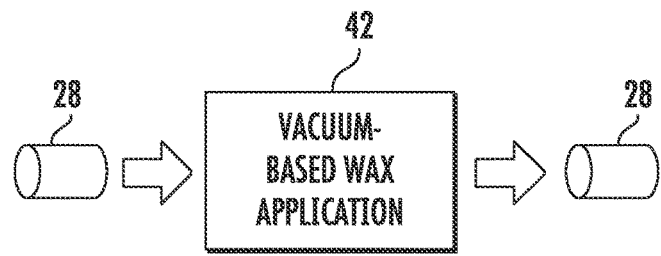
FIG. 5 schematically illustrates another example method of treating a sheave surface according to an embodiment of this invention.

Another example method of applying the wax filler 33 to the microcracks includes using a vacuum pump 42 for applying the wax filler 33 to the sheave 28 in a vacuum environment, as shown schematically in FIG. 5. The vacuum environment draws air and contaminants out of the microcracks 32, which allows the filler 33 to infiltrate the microcracks 32.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator system, comprising:
an elevator sheave, the elevator sheave including:
a sheave body,
a coating on a surface of the sheave body, the coating including microcracks,
a filler in the microcracks; and
a load bearing assembly at least partially wrapped around the elevator sheave such that the load bearing assembly is in a friction relationship with the coating on the sheave, wherein the load bearing assembly includes a jacket, the jacket comprising a polymer, wherein the filler is inert to the polymer, and wherein the filler comprises a material and the jacket comprises the material.

2. The elevator sheave of claim 1, wherein the filler comprises a wax.

3. The elevator sheave of claim 1, wherein the coating is a hard chrome coating.

4. The elevator sheave of claim 3, wherein the hard chrome coating is plated onto the sheave.

5. The elevator system of claim 1, wherein the jacket comprises at least one of a thermoplastic elastomer polymer, a thermosetting elastomer polymer, and a rubber polymer.

6. The elevator system of claim 1, wherein the filler comprises a wax and the jacket includes the wax.

7. The elevator system of claim 1, wherein:
the jacket comprises a polyurethane;
the polyurethane comprises wax additives; and
the filler comprises at least one of the wax additives.

* * * * *